Jan. 22, 1957 — L. D. STATHAM — 2,778,905

MOTION SENSING DEVICE

Filed Aug. 13, 1951 — 3 Sheets-Sheet 1

INVENTOR.
LOUIS D. STATHAM
BY Philip Subkow
ATTORNEY.

Jan. 22, 1957 L. D. STATHAM 2,778,905
MOTION SENSING DEVICE
Filed Aug. 13, 1951 3 Sheets-Sheet 2

INVENTOR.
LOUIS D. STATHAM
BY
ATTORNEY.

United States Patent Office

2,778,905
Patented Jan. 22, 1957

2,778,905

MOTION SENSING DEVICE

Louis D. Statham, Beverly Hills, Calif., assignor to Statham Laboratories, Inc., Los Angeles, Calif., a corporation of California Application August 13, 1951, Serial No. 241,539

19 Claims. (Cl. 201—48)

This invention relates to motion responsive devices for indicating and recording the magnitude and nature of motion. It belongs to the general class of vibrometers, velocitometers and accelerometers.

In the classic example of such systems, a spring suspended mass is damped by means of a liquid in which it is suspended. It is characteristic of such systems that they are critically limited in the frequency to which they will faithfully respond and this response is dependent upon temperature, since the viscous damping changes with temperature.

I have devised a motion responsive device based on an inertial mass which is subject to viscous damping in which the damping coefficient may be set at a desired value which will be sensibly constant or vary but within small limits over wide variations in temperature.

I obtain this advantageous result by employing, instead of a solid mass suspended on springs, as in the prior art, a liquid mass whose displacement, relative to a container is subjected to the motion to be sensed by the instrument, is measured.

Since I may use a liquid mass instead of a solid inertial mass, I may use a large mass without introducing a large hinge, such as would be necessary were I to use a solid mass of equivalent weight. Such a large weight would require a large hinge or pivots or springs in order to withstand mechanical shocks. Because, as stated above, I use as the effective inertial mass a liquid mass and do not employ a solid mass as the effective inertial mass, I avoid the use of hinges of the size that would be required if such solid masses were used.

The motion of the liquid mass in the container is damped because of the viscous drag of the liquid in the container when the differential motion of the container and fluid is obtained by the displacement of the container in space. This viscous drag is dependent upon the viscosity of the liquid and will increase with increase of viscosity resulting from a decrease in temperature. In order to overcome this variation in damping coefficient, I have added to the aforesaid damping of the liquid, a damping effect which decreases as the viscosity increases. By proportioning the aforesaid components of the damping so that the increase of one of the components of the damping balances the decrease of the other, I have been able to devise a system in which the damping coefficient is maintained constant for all practical purposes over wide ranges of temperature.

The maintenance of a substantially constant damping coefficient over such wide ranges of temperature insures that the device will be as faithfully responsive to as wide a range of frequencies of motion at high and at low temperatures as it is at ordinary temperatures. This is important in motion sensing devices which may be subjected to wide and perhaps rapid temperature variations.

I accomplish this effect by providing a liquid container which, upon displacement, will cause relative displacement of the container and liquid. I interpose a fine orifice in the path of the liquid. The displacement of the liquid in the container proper is damped by viscous drag in the container proper and by the energy loss in passing through the orifice. The energy loss or damping in the container proper is directly proportional to the viscosity of the liquid, but the energy loss of the fluid in passing through the orifice is inversely proportional to the viscosity. This may be generally expressed as follows:

$$Q = \frac{K_1}{\mu} + K_2 \mu \quad \text{(Eq. 1)}$$

when Q is the damping coefficient, i. e., the fraction of critical damping and $\mu$ is the viscosity of the liquid and $K_1$ and $K_2$ are constants characteristic of the mechanical system of the container, orifice, and the device employed for sensing the motion of the liquid. Q may be expressed as the sum of two damping terms $q_1$, the damping due to the leakage through the orifice, and $q_2$ the damping due to the viscous drag in the conduit, i. e., $$Q = q_1 + q_2 \quad \text{(Eq. 1a)}$$

and $$q_1 = \frac{K_1}{\mu} \quad \text{(Eq. 2)}$$

and $$q_2 = K_2 \mu \quad \text{(Eq. 3)}$$

By proper choice of the constants $K_1$ and $K_2$ as well as $\mu$, the value of Q may be made to be of the desired value. I prefer, for practical reasons, that it be in the neighborhood of about .7, especially when using the instrument as an accelerometer. The value will change but in a small amount, for example, from about .5 to .9 over a wide range of temperature, and this variation of damping coefficient can be made even smaller, if desired.

In the preferred embodiment of my invention I form the orifice as a peripheral crack between the edge of an orifice plate or other member which will partially obstruct or close the orifice and the peripheral edge of a hole in a barrier wall mounted in the liquid container.

The orifice plate is connected to a motion sensing device. The peripheral crack or peripheral orifice, as it will hereafter be called, may be circular, square, or have any other geometric form depending on the geometry of the plate and the similar geometry of the hole. The acceleration of the case causes relative motion of the liquid and the case, a portion of the liquid leaking through the peripheral orifice. The plate, because the liquid is substantially the effective inertial mass of the instrument, is displaced as a result of a pressure differential across the wall caused by this relative motion of the liquid and case. Means are provided which will respond to and measure the degree of displacement.

This invention will be further described by reference to the accompanying drawing, in which Fig. 1 is a top view with parts broken away and parts in section to better illustrate the instrument;

Figure 1:
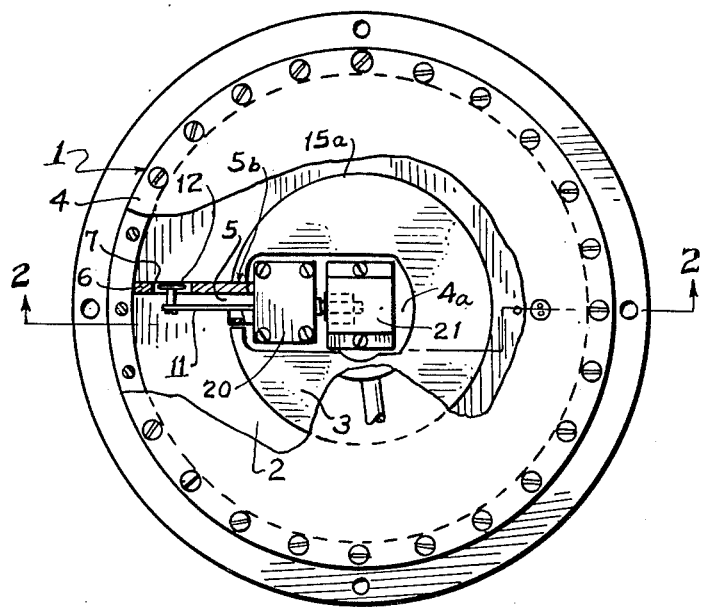
Figure 2:
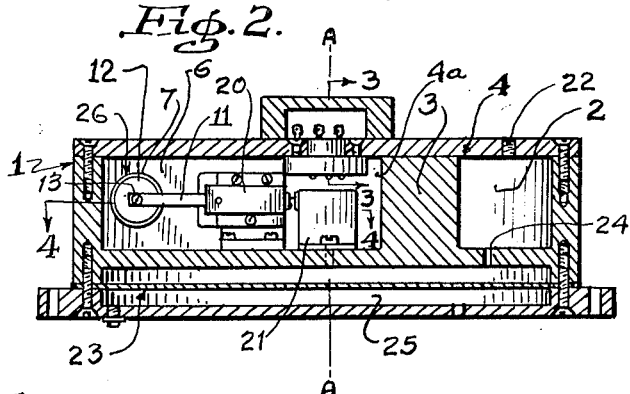
Fig. 2 is a section taken on line 2—2 of Fig. 1.
Figure 3:
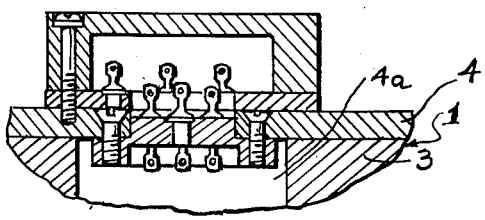
Fig. 3 is a section taken on line 3—3 of Fig. 2.
Figure 4:
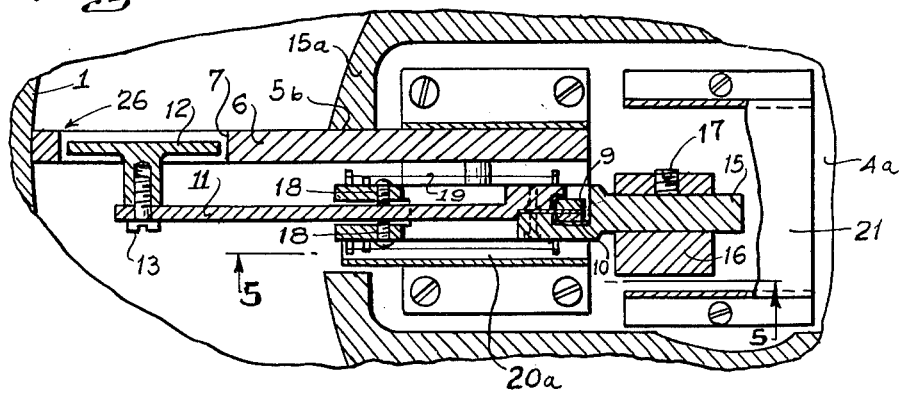
Fig. 4 is an enlarged fragmentary sectional view taken on line 4—4 of Fig. 2.
Figure 5:
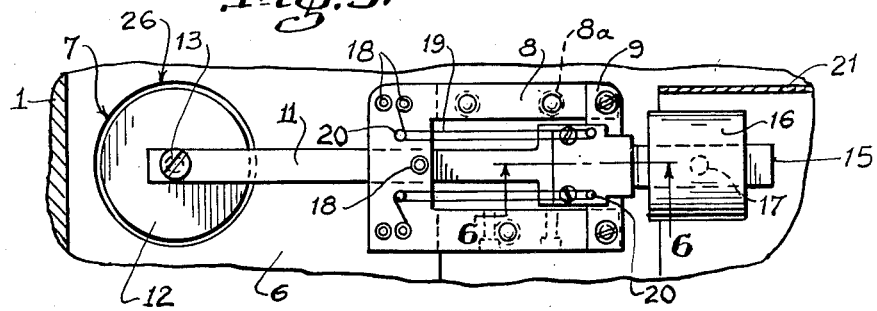
Fig. 5 is a view taken on line 5—5 of Fig. 4.
Figure 6:
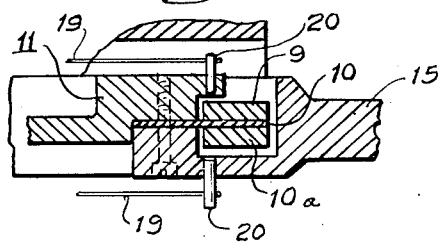
Fig. 6 is a vertical section taken on line 6—6 of Fig. 5.
Figure 7:
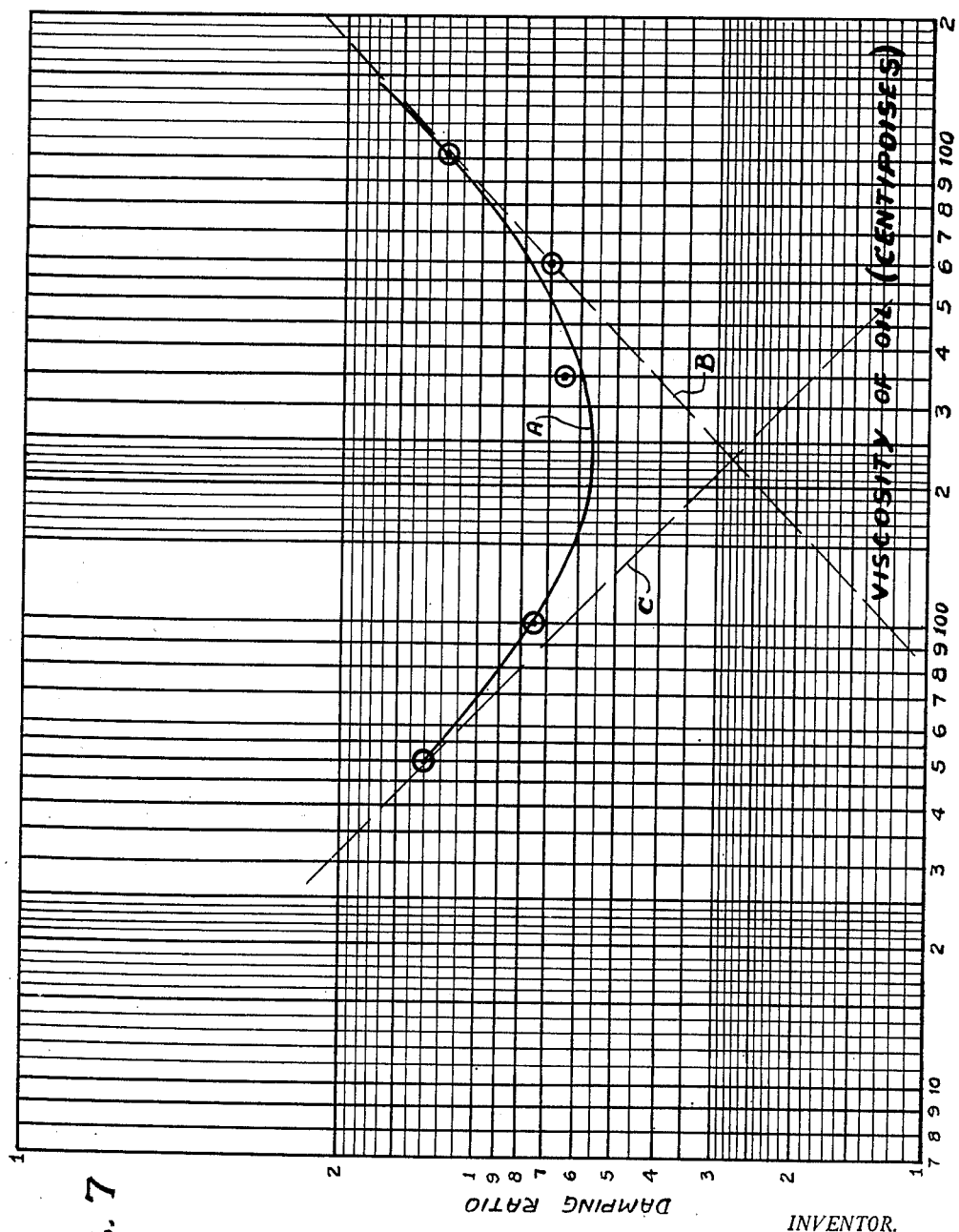
Fig. 7 is a graph showing a specific example of the relation of the damping coefficient to the viscosity in the device of my invention.

In the form shown in Figs. 1 to 6, inclusive, the device is designed to respond to a rotary motion and act as an angular accelerometer. The case 1 contains an annular channel 2, herein referred to as the main channel, between the wall of the chamber and the central core 3. The top cover 4 fits tightly over the wall of 1 and the core 3 encloses the channel 2. As is shown in Fig. 2, the channel has a square cross section. The central core 3 is cut out to provide a chamber 4a having an entrance slot 5. The channel 2 carries a barrier wall 6 which extends across the channel from the wall of 1 into the interior of the chamber 4 and abuts the lip 5b of the slot 5. The barrier wall carries a circular opening 7 in which is concentrically positioned a paddle 12 to be more fully described below. The dynamometer is connected to the paddle 12 and may be of many forms which will sense and report the deflection of the paddle 12. The form illustrated is a wire strain gage of the form shown in my Patent No. 2,453,549. It is composed of a frame 8 which is mounted by means of spacers 8a and suitable fastening means on the barrier wall 6. The flat spring 10 is clamped between the armature 11 and the balancing arm 15, and is also clamped between the clamping blocks 9 and 10a mounted on the frame 8. The armature extends into the channel 2 and has mounted thereon the paddle 12 by means of the screw 13. The paddle is concentrically placed in the hole 7 and spaced from the peripheral edge of the hole to provide a peripheral orifice 26. The balancing arm has an adjustable balancing weight 16 held in balancing position by screw 17. Strain wires, as illustrated, are employed as in the case of the aforementioned patent. Electrical connections to the gage are made by connecting strain wires 19 to the terminal 18 in the terminal box 20a positioned in the top as is shown in Figs. 2 and 3. The general form of the strain wire gage is now conventional and need not be further described. The adaptations thereof for the purposes of this instrument are set forth herein. It will be observed that the maximum permissible deflection of the paddle 12 is that permitted by the setting of the stops 18. The gage is covered by a cover 20 and the counterweight is covered by a cover 21.

The channel 2 is filled with a liquid through fill hole 22 and the paddle is completely immersed in the liquid and the liquid displaced by the paddle acts to make the paddle buoyant. A temperature compensating diaphragm 23 is mounted on wall 1 and together with the wall 1 and cover 4 form a closed container. The diaphragm 23 is provided for the expansion or contraction of the liquid with changes in temperature. Communication between the channel 2 and the temperature compensating diaphragm chamber is provided by suitable bore holes 24 spaced in any desired number and arrangement. The chamber 25 is vented to atmospheric pressure.

It will be observed that on angular acceleration of the instrument about the center line A—A (Fig. 2) or on any angular acceleration having a component of angular acceleration about an axis parallel to said axis A—A the pressure against the front and back faces of the paddle 12 will be different and will cause a displacement of the paddle which will be measured by the strain gage.

In the case of an angular acceleration, the liquid in channel 2 will, due to its inertia, tend to circulate in an endless liquid path and move relative to the channel walls and thus will cause a displacement of the paddle, due to the differential pressure across the paddle. The liquid flow is around the channel from one face of the paddle to the opposite face of the paddle and through the peripheral orifice 26 in an endless path or loop. It will be observed that the barrier wall 6 prevents flow except through the orifice 7 and this flow is restricted to that equal to the displacement of the paddle and that through the restricted peripheral orifice. The displacement of the paddle will be directly proportional to the angular acceleration and thus the output of the strain wire bridge will be proportional to the acceleration and the instrument may be calibrated against known angular acceleration.

The damping characteristics of the system described above is given by Equation 1.

The values of the constants will depend upon the geometry of the container and peripheral orifice, i. e., on the nature of the liquid conduit and the paddle size and configuration and the peripheral length and width of the peripheral orifice and also on the density and viscosity of the liquid as well as on the spring constant or rate of the motion sensing device.

However, systems of this invention having a given spring rate have the following generic properties. Their natural frequency decreases in inverse proportion to the increase in area of the paddle, and their range, that is, the upper value of the acceleration which they will report, will also vary inversely to the variation in the paddle size, and therefore because the effective inertial mass is substantially entirely that of the liquid the natural frequency varies directly as the range. In conventional spring suspended sensing systems, with a solid mass suspended on such springs, as the effective inertial mass, the natural frequency varies as the square root of the range. These generic properties inhere from the fact that substantially the entire effective inertial mass of the system is the liquid inerial mass, whereas in the said conventional systems substantially the entire effective inertial mass is a solid inertial mass. The upper value of the acceleration will be higher the smaller the paddle area. The damping coefficient remains sensibly constant over a wide range of temperatures. The variation of the damping coefficient over any range of temperature, for any instrument and for any damping liquid, will be less, the smaller the temperature coefficient of viscosity of the liquid, i. e., the flatter the slope of the viscosity temperature line of the ASTM chart on which temperature is plotted arithmetically on the abscissa and viscosity logarithmetically on the ordinate.

It will also appear from Equation 1 that the value of the damping coefficient Q will pass through a minimum at a value of $\mu$ which will be equal to the square root of the ratio $K_1/K_2$, as will appear by differentiating the Equation 1 and setting the differential equal to zero and solving for $\mu$.

The viscosity at which the minimum is attained will therefore depend upon these constants $K_1$ and $K_2$. The magnitude of these constants depends upon the density of the oil and upon the spring rate (i. e., the spring constant) of the motion sensing device connected to the paddle and the geometry of the paddle, the peripheral orifice, and the main channel. The viscosity at which this minimum value of the damping is obtained will be the less, the greater is the density of the liquid. I have found that the viscosity at which this minimum value of the damping coefficient is obtained will be the greater, the greater the value of the spring constant of the motion sensing device connected to the paddle and also the greater the width of the peripheral gap. The viscosity at which minimum value of the damping coefficient is obtained will be the less as any of the following parameters of the instrument are greater, i. e., the greater the operative area of the paddle, i. e., the area of the paddle, including the peripheral area around the paddle measured to the mid-point of the peripheral gap. The viscosity at which the minimum value of the damping coefficient will be obtained will also be the less, the greater the hydraulic diameter of the main channel and the greater the length of the peripheral gap.

I may also, in the instrument of my invention, vary the damping coefficient at any temperature and the variation of the damping coefficient with temperature by a suitable selection of an oil. As has been stated previously, the less steep is its temperature viscosity line (as defined above), the less the variation of the damping with temperature will become. This variation may also be further reduced if the coefficient of expansion of the liquid with temperature is made low. The lower the temperature coefficient of expansion, the less the variation in the damping coefficient. The higher the density of the liquid the less must be its viscosity. I have a greater degree of flexibility since I may choose a high density, low viscosity, or a high viscosity, low density liquid within the range necessary to give the desired damping coefficient.

Thus, by a proper selection of the oil I may in any instrument of my design obtain a desirable minimum damping coefficient and a desirable variation of this damping coefficient and a desirable variation of this damping coefficient with temperature.

The variation in the damping coefficient is much less affected by the variation of density with temperature than by the variation in viscosity with temperature. Thus a wider latitude is possible in the choice of liquids with respect to their coefficient of expansion as compared with the variation of viscosity with temperature. I desire, therefore, to choose a fluid having a low viscosity temperature susceptibility even though it be of low density, particularly if it have also a low value of its cubical, coefficient of expansion, rather than to choose a liquid of high viscosity temperature susceptibility and high density, particularly if it also have a high value for its cubical coefficient of expansion. This leads me to select as my preferred liquid an oil and preferably the synthetic silicone polymers which have flat viscosity temperature lines on the ASTM chart. Thus, by a proper selection of the magnitude of the design parameters of my instrument as described above, I may select the desired damping ratio which will remain sensible constant over a wide range of viscosities of the damping oil.

The choice of the design will depend upon the range of acceleration which it is desired that the instrument measure and the natural frequency which it is desired to build into the instrument.

For any conveniently chosen liquid and container design in which the liquid is to undergo displacement, i. e., an oil channel having a chosen hydraulic diameter, the natural frequency of the instrument will depend upon the design parameters of the instrument. The natural frequency will be the less, the smaller any of one of the following parameters. The natural frequency will be less the smaller the spring constant of the instrument. The natural frequency will be the less the greater the effective area of the paddle. The natural frequency will be the less the longer the flow path of the liquid in the container channel. The range of the above instrument is the greater the greater the natural frequency and as the greater the permissible deflection of the paddle.

Thus, by selecting the desired range A, i. e., the upper value of the acceleration to be measured by the instrument and the natural frequency of which the system is to have and the desired minimum value of Q, one may, by choosing desirable values of the design parameters in accordance with the principles set forth above, obtain a device having the above characteristics.

Thus, the following example will illustrate a specific case of an instrument of design as shown in Figs. 1 to 6, inclusive, and is here given to illustrate my invention and not to be a limitation thereof:

The sensitivity of the instrument is 0.9 millivolt output/volt input/radian/sec./sec./.

The natural frequency of the unit is chosen to be 9.5 cycles per second.

The sensitivity of the dynamometer is 450 millivolts/volt/radian.

The dynamometer lever arm is 2.25 inches.
The diameter of the paddle is 0.550 inch.
The thickness of the paddle is 0.03 inch.
The width of the peripheral gap around the paddle is .05″.

The spring constant of the dynamometer is 0.8″ pound/radian.

The radius of the channel, measured from the center of the instrument to the center line of the channel, is 2.25 inches, and it is of square cross-section, 1 inch by 1 inch.

The liquid with which the instrument is filled is an organo-silicon oil which has a density of very nearly 1 and a viscosity of 200 centipoises at 70° F.

The permissible deflection of the paddle is .01 radian.

The determined values of Q for the instrument designed to have the above parameters measured at temperatures chosen so that $\mu$ varies as shown are given by the table:

| $\mu$ (in centistokes): | Q (damping ratio) |
|---|---|
| 50 | 1.3 |
| 100 | .75 |
| 350 | .65 |
| 600 | .7 |
| 1000 | 1.2 |

Fig. 9, curve A, is a plot of the values of $\mu$ against the values of Q and its equation is Equation 1 for the above instrument with the values of $K_1$ and $K_2$ as shown.

$$Q=\frac{6300}{\mu}+0.0012\mu \qquad (Eq.\ 4)$$

Line B expresses the effect of change in the viscosity of the liquid on the contributions to the value of Q by the energy loss in passing through the peripheral gap as expressed by Equation 2, and line C is the equation expressing the effect of the viscosity on the contributions of this energy loss by viscosity drag in the main channel as is expressed by the Equation 3. The curve A is thus an expression of the effect of viscosity of the fluid upon the total damping.

The selection of the particular oil resulted in a minimum value of Q to be 0.56 at a viscosity of 240 centistokes attainable at 72° F.; the value of the damping coefficient at about 80° F. is set at .7 and its variation over the range of −20° F. to 257° F. from .56 to 1.2, and within the range of 0° F. to 195° F., the range is from .56 to .9.

While I have shown an electrical strain gage as the preferred form of the device for sensing the motion of the paddle, my invention is not restricted to this form of sensing device. Those skilled in the art will recognize that other conventional motion sensing devices may be mounted in the device of my invention to indicate the displacement of the paddle.

While I have described a particular embodiment of my invention for the purpose of illustration, it should be understood that various modifications and adaptations thereof may be made within the spirit of the invention as set forth in the appended claims.

I claim:

1. In a motion responsive device, a housing having a cylindrical wall, a cover to said housing, a cylindrical core located concentrically within said cylindrical housing, a chamber in said core, a bottom to said housing, a barrier wall positioned between said core and said cylindrical wall, an aperture in said wall, a paddle of a lesser area than the aperture in said wall and located within said aperture, an electrical strain wire gage mounted in said cylindrical core, an arm, one end of said arm secured to said paddle, a flat spring secured to the opposite end of said arm, said spring being securely mounted adjacent the inner end of said arm within said chamber in the above mentioned cylindrical core, an extension on said arm, a weight adjustably mounted on said extension, and electrical resistance strain wires connected to said arm.

2. In a motion responsive device, a cylindrical housing, a cover to said housing, a cylindrical core located concentrically within said cylindrical housing, a chamber in said core, a bottom to said housing, all of the above forming a liquid confining circular channel within said housing, a barrier wall positioned across said channel, an aperture in said wall, a paddle of a lesser area than the aperture in said wall and located within said aperture, an electrical strain wire gage mounted in said cylindrical core, an arm, one end of said arm being secured to the paddle at its outer end, a flat spring secured to the opposite end of said arm, said spring being securely mounted adjacent the inner end of said arm within said chamber in the above mentioned cylindrical core, an extension on said arm, a weight adjustably mounted on said extension, and means operatively connected to said arm to limit the deflection of said arm.

3. In a motion responsive device, a cylindrical housing, a cover to said housing, a bottom to said housing, all of the above forming a liquid confining circular channel within said housing, a barrier wall positioned across said channel, an aperture in said wall, a paddle of a lesser area than the aperture in said wall and located within said aperture, an electrical strain wire gage mounted in said housing, and a connector between said paddle and the armature of said strain gage.

4. An accelerometer in which the effective inertial mass is substantially a liquid inertial mass adapted to be moved angularly in space, a chamber, an endless channel in said chamber, liquid inertial mass in said channel forming an endless liquid loop in said channel, the walls of said channel enclosing said liquid and constraining the circulation of said liquid relative to the walls of said channel entirely within said channel around said endless loop in said endless channel, a restricted liquid passageway in said channel, said liquid circulating around said loop and through said passageway on angular acceleration of said chamber in space having a component of angular acceleration about an axis parallel to the axis of said loop, and means responsive to the magnitude of the difference in pressure in the channel on both sides of said passageway to measure the angular acceleration of said chamber.

5. An accelerometer in which the effective inertial mass is substantially a liquid inertial mass comprising an enclosed chamber, an endless liquid passageway in said chamber, a liquid inertial mass in said passageway movable in said endless passageway on acceleration of said chamber, a fixed support in said chamber, a member positioned in said passageway and immersed in said liquid and positioned transversely to direction of motion of said liquid in said chamber on acceleration of said chamber, said member being hingedly mounted on said fixed support and spaced from the walls of said passageway, said member deflecting on said support with respect to said wall on acceleration of the chamber, the liquid circulating around said endless passageway and by said member the magnitude of said deflection being proportional to the magnitude of said acceleration and means for measuring the magnitude of said deflection.

6. An accelerometer in which the effective inertial mass is substantially a liquid inertial mass comprising an enclosed chamber, an endless liquid passageway in said chamber, liquid inertial mass movable in said passageway on acceleration of said chamber, a fixed support in said chamber, a member positioned in said liquid in said passageway and having opposed surfaces, each surface in contact with said liquid, said member being spaced from the walls of said passageway and being resiliently mounted on said fixed support, said passageway forming an endless liquid communicating path from one of said surfaces to the other of said surfaces, said liquid in said endless path forming a liquid rotor and said liquid circulating in said endless passageway in respect to the walls of said passageway on angular acceleration of said chamber to cause a relative flow of fluid around said endless passageway and by said member and from one of said surfaces to the other of said surfaces, said surfaces being positioned transversely to the direction of rotation of said liquid rotor, said member deflecting on said support on acceleration of the chamber, the magnitude of said deflection being proportional to the magnitude of said acceleration and means for measuring the said deflection.

7. An accelerometer in which the effective inertial mass is a liquid inertial mass comprising a chamber, an endless liquid passageway in said chamber, liquid inertial mass in said passageway forming an endless liquid loop in said chamber, a fixed support in said chamber, a member positioned on said support in said passageway and spaced from the wall thereof, said member being immersed in said liquid, said member being hinged intermediate its ends to said fixed support for angular movement on said support in said chamber, said member being weight balanced on both sides of said hinge, and means to limit the angular movement of said member on said hinge, said member deflecting on said support on acceleration of the chamber, the magnitude of said deflection being proportional to the magnitude of said acceleration and means for measuring the said deflection.

8. An accelerometer in which the effective inertial mass is a liquid inertial mass comprising an enclosed chamber, a liquid in said chamber, a fixed support in said chamber, a member positioned in said chamber and having opposed surfaces, said member being immersed in said liquid, said member being resiliently mounted on said fixed support and spaced from the walls of said chamber for limited angular movement on said support in said chamber, an endless liquid communicating passageway in said chamber, an inertial liquid in said passageway and filling said passageway from one of said surfaces to the other of said surfaces and between the said member and the said wall of said passageway, said liquid in said endless path forming a liquid rotor on angular acceleration of said chamber to cause a relative circulatory flow of liquid between said member and said walls and from one of said surfaces to the other of said surfaces, said surfaces being positioned transversely to the direction of rotation of said liquid rotor, said member deflecting on said support on acceleration of the chamber, the magnitude of said deflection being proportional to the magnitude of said acceleration and means for measuring the magnitude of said deflection.

9. An accelerometer in which the effective inertial mass is substantially a liquid inertial mass comprising a chamber, a closed liquid conduit loop in said chamber, a restricted liquid passageway in said loop, a support fixedly mounted in said chamber, a paddle movably mounted in said chamber, a hinge between said paddle and said support, said paddle being mounted on said hinge for limited angular displacement in said chamber on angular acceleration of said chamber, a resilient connection between said paddle and said support, liquid inertial mass in said conduit loop, said paddle being immersed in said liquid, and means for measuring the angular displacement of said paddle on said support.

10. An accelerometer comprising a chamber, said chamber including an endless liquid conduit, a fixed mount in said chamber, a paddle in said conduit, said paddle being spaced from the walls of said conduit to form a restricted orifice, said paddle being hingedly and resiliently mounted on said mount for limited angular deflection of said paddle in said conduit on said hinge, on acceleration of said chamber, liquid inertial mass in said conduit, said paddle being immersed in said liquid, said conduit forming a closed liquid path through said restricted orifice and around said conduit through which the fluid flows on angular acceleration of said chamber, and means for measuring the angular displacement of said paddle.

11. An accelerometer comprising a chamber, said chamber including a closed liquid conduit, an inertial liquid mass in said conduit, a barrier wall across said conduit, an opening in said wall, a paddle positioned in said opening and means to flexibly and hingedly mount said paddle in said chamber for angular displacement about said hinge, said paddle spaced from the edges of said wall at said opening to form a restricted passageway for said liquid, and means for measuring the angular displacement of said paddle on said hinge.

12. An accelerometer, an enclosed case, said case including a liquid confining closed conduit, an inertial liquid mass in said conduit, a barrier wall across said conduit, a liquid passageway from one side of the wall to the other side of the wall, and around said conduit, a paddle positioned in said passageway, the edges of said paddle spaced from the edges of said wall forming a restricted aperture, a hinge mounting for said paddle in said case for angular displacement of said paddle in said case in acceleration of said case and means for measuring the angular displacement of said paddle.

13. An accelerometer in which the effective inertial mass is substantially a liquid inertial mass, comprising an endless liquid passageway, a barrier wall in said passageway, a restricted liquid passageway through said wall, said liquid passageway extending from one side of said wall around said passageway to the other side of said wall, liquid inertial mass in said passageway, said liquid mass forming a liquid loop, said liquid circulating in said endless passageway around said loop and through said restricted passageway on acceleration of said accelerometer about an axis parallel to the axis of said loop, and measuring means responsive to the magnitude of the difference in pressure on both sides of the restricted passageway to measure the angular acceleration of said accelerometer.

14. An accelerometer in which the effective inertial mass is substantially a liquid inertial mass adapted to be moved angularly in space, a chamber, an endless channel in said chamber, liquid inertial mass in said channel forming an endless liquid loop in said channel, the walls of said channel enclosing said liquid and constraining the circulation of said liquid relative to the walls of said channel entirely within said channel around said endless loop in said endless channel, a restricted liquid passageway in said channel, said liquid circulating around said loop and through said passageway on angular acceleration of said chamber having a component of angular acceleration about an axis parallel to the axis of said loop, and means responsive to the magnitude of the difference in pressure in the channel on both sides of said passageway to measure the angular acceleration of said chamber, said means comprising a member immersed in said liquid, a fixed support in said chamber, said member being movably mounted on said fixed support and movable thereon in response to said difference in pressure and means for measuring the motion of said movable chamber.

15. In claim 3, said means comprising a paddle immersed in said liquid, means for mounting said paddle for motion relative to the walls of said channel and an electrical resistance strain wire gage connected to said paddle.

16. An accelerometer comprising a chamber, said chamber including an endless liquid conduit, a fixed mount in said chamber, a paddle in said conduit, said paddle being spaced from the walls of said conduit to form a restricted orifice, said paddle being hingedly and resiliently mounted on said mount for limited angular deflection of said paddle in said conduit on said hinge on acceleration of said chamber, said paddle being weight balanced about said hinge, liquid inertial mass in said conduit, said paddle being immersed in said liquid, said conduit forming a closed liquid path through said restricted orifice and around said conduit through which the fluid flows on angular acceleration of said chamber, and means for measuring the angular displacement of said paddle.

17. An accelerometer in which the effective inertial mass is substantially a liquid inertial mass comprising a chamber, a closed liquid conduit loop in said chamber, a restricted liquid passageway in said loop, a support fixedly mounted in said chamber, a paddle movably mounted in said chamber, a hinge between said paddle and said support, said paddle being mounted on said hinge for limited angular displacement in said chamber on angular acceleration of said chamber, a resilient connection between said paddle and said support, intermediate the ends of said paddle, liquid inertial mass in said conduit loop, said paddle being immersed in said liquid, and means for measuring the angular displacement of said paddle on said support.

18. An inertia responsive device belonging to the class comprising vibrometers, velocitometers and accelerometers for sensing angular motion in which the effective inertial mass is substantially a liquid inertial mass, comprising a case adapted to be displaced in space in angular motion, an endless liquid passageway in said case, a liquid inertial mass in said passageway, said liquid forming an endless liquid loop in said passageway, said case being movable with respect to said inertial liquid mass in said passageway on angular displacement of said case in space to cause a relative rotary and circulatory motion of said liquid entirely within and entirely around said endless passageway and relative to the walls of said passageway, and means responsive to the said relative motion of said liquid and said walls, said means including means for measuring the magnitude of said relative angular displacement of said liquid and the walls of said case to measure the angular acceleration of said case, said means including a pressure responsive device operatively associated with said liquid and movable responsive to said pressure, and an electrical resistance strain wire gage connected to said motion responsive device.

19. An inertia responsive device belonging to the class comprising vibrometers, velocitometers and accelerometers for sensing angular motion in which the effective inertial mass is substantially a liquid inertial mass, comprising a case adapted to be displaced in space in angular motion, an endless liquid passageway in said case, a liquid inertial mass in said passageway, said liquid forming an endless liquid loop in said passageway, said case being movable with respect to said inertial liquid mass in said passageway on angular displacement of said case in space to cause a relative rotary and circulatory motion of said liquid entirely within and entirely around said endless passageway and relative to the walls of said passageway, and means responsive to the said relative motion of said liquid and said walls, said means including means for measuring the magnitude of said relative angular displacement of said liquid and the walls of said case to measure the angular acceleration of said case, said means responsive to said relative motion comprising a paddle immersed in said liquid, means for mounting said paddle for motion relative to the walls of said channel, and said electrical resistance strain wire gage being connected to said paddle.

References Cited in the file of this patent

UNITED STATES PATENTS

| | | |
|---|---|---|
| 1,305,961 | Burgess | June 3, 1919 |
| 1,574,460 | Williamson | Feb. 23, 1926 |
| 1,581,957 | Keller | Apr. 20, 1926 |
| 2,225,716 | Sexton | Dec. 24, 1940 |
| 2,390,384 | Poole | Dec. 4, 1945 |
| 2,445,234 | Muller | July 13, 1948 |
| 2,481,792 | Statham | Sept. 13, 1949 |
| 2,522,796 | Olson et al. | Sept. 19, 1950 |

FOREIGN PATENTS

| | | |
|---|---|---|
| 278,905 | Germany | Oct. 7, 1914 |
| 347,808 | Great Britain | May 7, 1931 |